Oct. 9, 1923.
I. I. EREMEEFF
MOVABLE HANGAR FOR LARGE AIRCRAFT
Filed Sept. 14, 1921
1,470,557
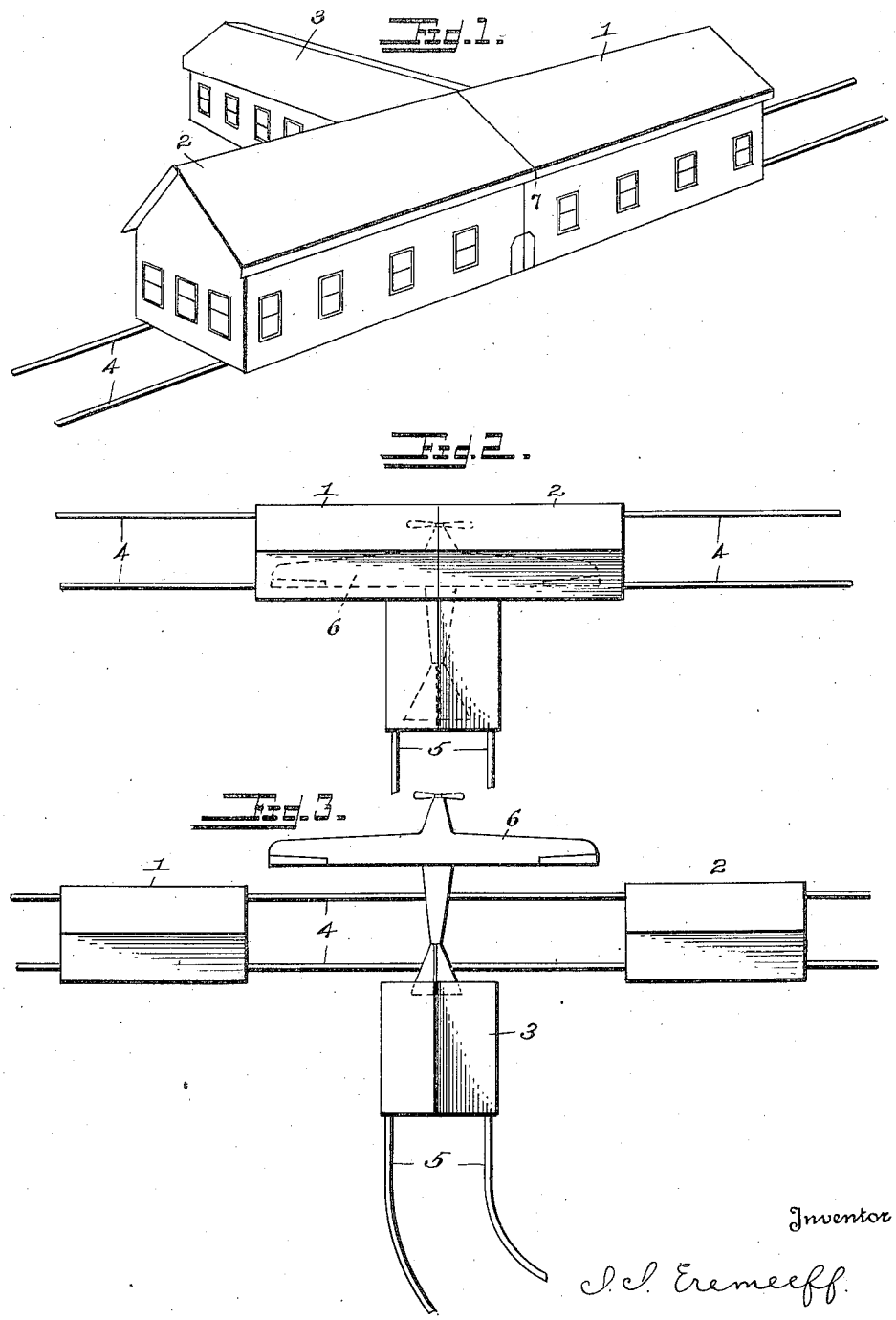

Patented Oct. 9, 1923.

1,470,557

UNITED STATES PATENT OFFICE.

IVAN I. EREMEEFF, OF DAYTON, OHIO.

MOVABLE HANGAR FOR LARGE AIRCRAFT.

Application filed September 14, 1921. Serial No. 500,559.

*To all whom it may concern:*

Be it known that I, IVAN I. EREMEEFF, citizen of Russia, residing at Dayton, in the county of Montgomery and State of Ohio, have invented certain new and useful Improvements in Movable Hangars for Large Aircraft, of which the following is a specification.

This invention relates to portable buildings in general and more particularly to an improved movable hangar for large aircraft.

In housing large type of air craft in the conventional type of hangar it is necessary to either remove the wings of the aircraft or to provide said aircraft with folding wings, as the entrance to the hangar is not sufficiently large.

It is therefore proposed to provide a hangar comprising three separate sections movable with relation to each other, and suitably mounted on tracks. The complete hangar when assembled resembles a T, having one section for the fuselage and a section for each set of wings, left and right. The track on which the fuselage hangar section is mounted may be so curved as to allow the ship to be taxied to the proper position after which the three hangar sections are moved into place, thus inclosing the entire aircraft therein.

With the foregoing and other objects in view which shall appear as the description proceeds, the invention resides in the combination of parts and the details of construction hereinafter described and claimed, it being understood that changes in the precise embodiment of the invention herein described, may be made within the scope of what is claimed, without departing from the spirit of the invention the specific embodiment of which is illustrated in the attached drawings in which:

Figure 1 is a view in perspective of the complete hangar in assembled position.

Figure 2 is a diagrammatical plan view of the assembled hangar showing the inclosed aircraft in dotted lines.

Figure 3 is a diagrammatical plan view of the dissembled hangar showing the sections separated and the aircraft removed therefrom.

Referring more particularly to the drawings the hangar sections 1 and 2 are provided for housing the wings of the aircraft 6. A track 4 is provided on which the sections 1 and 2 are suitably mounted to enable the sections to be separated and brought together. A hangar section 3 is provided for the housing of the aircraft fuselage and is mounted on the track 5. The track 5 may be curved in order that hangar section 3 may be shifted to a position which will enable the ship to be taxied into the proper position, as shown in dotted lines in Figure 2, after which the three hangar sections are moved into the position in which they are shown in Figures 1 and 2. The roofs of the hangar sections may be provided with over-lapping portions for the purpose of making the connection thereof leak-proof. This feature is illustrated in Figure 1 which shows the roof of the section 2 over-lapping that of the section 1 at a point 7. Thus it will be seen from the foregoing description that a hangar is provided which will be easily constructed, conveniently shiftable into and out of position, and which is capable of being so shifted as to allow the ship to be taxied into the proper position to allow the hangar sections to be closed thereabout, without further moving said ship.

Having thus described my invention, I claim:

1. A hangar for aircraft comprising three sections, one of said sections being adapted to inclose the fuselage of said aircraft, and a section for each set of wings of said aircraft, all of said hangar sections being mounted on tracks, said sections being adapted to be moved into and out of position for inclosing said aircraft.

2. A hangar for aircraft comprising three sections, one of said sections being adapted to inclose the fuselage of said aircraft and a section for each set of wings of said aircraft, a straight track adapted to carry said wing-inclosing hangar section, and a curved track for carrying said fuselage-inclosing section for the purpose of separating all of said sections to enable said aircraft to be taxied into position and said sections to be assembled thereabout.

In testimony whereof I have affixed my signature.

IVAN I. EREMEEFF.